United States Patent

[11] 3,586,963

[72] Inventors Anthony Arrott
West Vancouver, B. C., Canada;
Richard L. Dennis, Dearborn; Carl H. Haakana, Detroit; Robert G. Jones, Dearborn Heights; Robert J. Warrick, Ann Arbor, all of, Mich.
[21] Appl. No. 813,046
[22] Filed Apr. 3, 1969
[45] Patented June 22, 1971
[73] Assignee Ford Motor Company
Dearborn, Mich.

[54] MAGNETICALLY DETERMINING MECHANICAL PROPERTIES OF MOVING FERROMAGNETIC MATERIALS
22 Claims, 7 Drawing Figs.

[52] U.S. Cl.................................................. 324/34R
[51] Int. Cl..................................................... G01r 33/12
[50] Field of Search............................................. 324/34, 40

[56] References Cited
UNITED STATES PATENTS
2,594,947 4/1952 Lynch.......................... 324/34
3,490,033 1/1970 Elarde.......................... 324/40

FOREIGN PATENTS
1,076,168 7/1967 Great Britain.................. 324/34

*Primary Examiner*—Rudolph V. Rolinec
*Assistant Examiner*—R. J. Corcoran
*Attorneys*—John R. Faulkner and Glenn S. Arendsen ABSTRACT: A moving strip of sheet steel passes through a magnetic field that brings the magnetization in the sheet to effective saturation first in one direction and then in the other direction. As the sheet emerges from the applied field, the magnetization passes from the remanent value of one sign to the remanent value of the other sign. Sensing coils measures the flux change produced by passing from one remanent magnetization to the other and this flux change is halved to give the flux change necessary to reach a computed zero value of magnetization. The applied field necessary to maintain the magnetization in the sheet at the computed zero value represents the coercive force of the sheet, which is proportional to various mechanical properties of the steel such as the tensile strength. Instead of using remanent magnetization to compute the zero value, the sensing coils can be located within the applied magnetic field and the flux change produced by passing between the magnetization at saturation can be used.

ANALOG OUTPUT

PATENTED JUN22 1971

INVENTORS
ANTHONY ARROTT
RICHARD L. DENNIS
CARL H. HAAKANA
BY ROBERT G. JONES
ROBERT J. WARRICK

John R. Faulkner
Glenn S. Arendsen
ATTORNEYS

INVENTORS
ANTHONY ARROTT
RICHARD L. DENNIS
CARL H. HAAKANA
ROBERT G. JONES
BY ROBERT J. WARRICK

John R. Faulkner
Glenn S. Arendsen
ATTORNEYS

MAGNETICALLY DETERMINING MECHANICAL PROPERTIES OF MOVING FERROMAGNETIC MATERIALS

BACKGROUND OF THE INVENTION

Determining the mechanical properties of sheet steel at various stages during its manufacture and prior to winding the steel into rolls for shipping is essential to production of high quality vehicles, appliances and other products. Mechanical properties determined during manufacturing can be used to modify subsequent processes to produce a steel strip having predetermined uniform properties along its entire length. Equally important is determining mechanical properties just prior to winding the sheet into a roll for shipping, for the data can be recorded and forwarded to the customer with the roll.

The surface hardness of the steel sheet has been used in the past to estimate its tensile and yield strength. Surface hardness could not be determined without marring the sheet and disrupting sheet movement through its processing and the hardness figures correlated only roughly at best with mechanical properties such as tensile or yield strength. Running laboratory tests on small samples cut from the beginning, middle and end of each sheet also has been used to estimate mechanical properties of the entire sheet. In many cases, however, the steel strip had completed its processing and was already on the way to the customer when the results from such samples became available.

By measuring magnetic properties of the laboratory samples and using the magnetic data to estimate the mechanical properties of the sheet, laboratory results have been made available more rapidly. Obtaining the samples disrupted sheet processing and the small number of samples provided only a rough indication of the average sheet properties rather than the actual properties of each portion of the sheet.

SUMMARY OF THE INVENTION

This invention provides a process and a mechanism for determining accurately and rapidly the tensile strength and other mechanical properties of succeeding segments of a moving ferromagnetic material such as steel sheet, strip, bar or plate. The segments can be close enough together so measurements represent a reasonably accurate picture of the continuous sheet properties. Data on the properties is available immediately and can be used to control subsequent processes capable of selectively modifying the properties of each portion of the material.

The process comprises passing the material through a coil that applies a magnetizing force bringing the intensity of magnetization, referred to herein as simply the magnetization, in the material to effective saturation first in one direction and then in the other direction, and sensing the flux change produced by passing from one value of magnetization to the value having the opposite sign. This flux change is divided in half to obtain the flux change necessary to bring the magnetization from either value to a value that, because of the symmetry of the hysteresis loop about its X axis substantially equals zero magnetization. The magnetic field necessary to bring the magnetization to the halved value then is applied. The applied field at the halved value is proportional to the coercive force of the material and is an accurate predictor of various mechanical properties of the material such as its tensile or yield strength. Succeeding segments of the material are monitored as the segments pass through the sensing coil to produce substantially continuous data on the mechanical properties. For purposes of this specification and claims, the phrase "intensity of magnetization" or "magnetization" identifies the growth or rotation of magnetic domains in the material. A "magnetizing force" or "applied field" refers to an eternally generated magnetic flux that is applied to the material. The phrase "effective saturation" identifies the points on a hysteresis loop of the sheet material in which magnetization is plotted against magnetizing force where further increases in the magnetizing force do not change the basic width of the loop. Increasing values of magnetizing force from these points might produce minor increases in the magnetization in some materials, but the hysteresis loop nevertheless has substantially the same intercepts on the magnetizing force axis when the magnetizing force is reversed.

Both DC and AC mechanisms can be used to carry out the process of this invention. The DC mechanism consists of a saturation coil surrounding the moving material and containing sufficient DC current to bring the magnetization in the material to effective saturation. Downstream of the saturating coil is a coercivity coil that surrounds the sheet and encompasses two smaller sensing coils, one of which also surrounds the sheet. The sensing coils combine to sense variations in the magnetization from a computed zero value of each sheet segment moving through the coils. Signals from the sensing coils adjust the DC current in the coercivity coil to maintain the magnetization at the computed zero value. Current in the coercivity coil is proportional to the coercive force of the material and is used to compute its mechanical properties.

Determining the computed zero value is accomplished in the DC system by a periodic calibration. Calibration begins by stopping all current in the coercivity coil. As the material emerges from the saturating coil, the magnetization in the sheet passes to its remanent value. The sensing coils generate a signal only when the magnetization of the material is changing and the signal stabilizes on the remanent value. Current in the saturation coil then is reversed to bring the magnetization in the sheet to effective saturation in the opposite direction. The sensing coils generate a signal proportional to the flux change produced in passing from one remanent magnetization intensity to the other. This value is halved to reach the computed zero value. Operation then is resumed by applying current to the coercivity coil to maintain the magnetization at the newly computed zero value.

In the DC mechanism, the coercivity coil must be located sufficiently downstream from the saturation coil to prevent the field of the saturation coil from influencing measurements in the coercivity coil. Additionally, the length of material between the saturation coil and the coercivity coil must be free from significant vibration. The AC mechanism is located compactly in an outer coil that serves as both the saturation and coercivity coil. The outer coil surrounds both the material and two sensing coils, one of which also surrounds the material. Alternating current sufficient to effectively saturate the material in both directions is applied to the outer coil. The sensing coils measure the flux change produced when the magnetization passes from saturation of one sign to saturation of the other sign as the material traverses one-half cycle of its hysteresis loop. This flux change is halved and the resulting value is stored electronically. When the flux change produced by changing the applied field toward the first saturation point (i.e., in the second half cycle of the half cycle hysteresis loop) equals the stored value, electronic circuitry measures the current in the outer coil. That current is proportional to the coercive force and is used to compute the mechanical properties. The total flux change again is measured during the second half cycle of the hysteresis loop and half of it is stored. When the material traverses the first half cycle of the hysteresis loop, another measurement is made of the coercive force based on the new computed flux change.

Both the DC and AC systems preferably apply the magnetic field along the moving axis of the material. With the sensing coil surrounding the material, values of magnetization measured in the sensing coil represent an average value for a segment of the material extending across its width. Mechanical properties of all rolled shapes, including bars, strips, sheets, and slabs of ferromagnetic materials having a temperature below the Curie temperature can be measured by the process on a substantially continuous basis without disrupting the material finish or movement. Variations in cross sectional area of the materials do not affect either system during actual measurement of coercive force, but can produce inaccuracies if the variations occur during determination of the computed value of zero magnetization. In most operations, such variations are minor and can be ignored; in others, the variations can be compensated by measuring the cross-sectional area of the material and modifying the signal from the sensing coil accordingly.

Digital electronic circuitry improves the accuracy of measurements of the applied field and the magnetization, particularly with the AC system. Such circuitry typically converts the voltage from the sensing coils into a frequency proportional to the voltage and counts the pulses of the frequency to produce a digital numeral representing the time integrated voltage, which is the change in the magnetization. Simultaneously, a digital numeral representing one-half of the change in magnetization is produced. A digital comparison of the numerals triggers a sampling circuit that measures the instantaneous applied field, which is the coercive force of the material.

DETAILED DESCRIPTION

Figure 1:
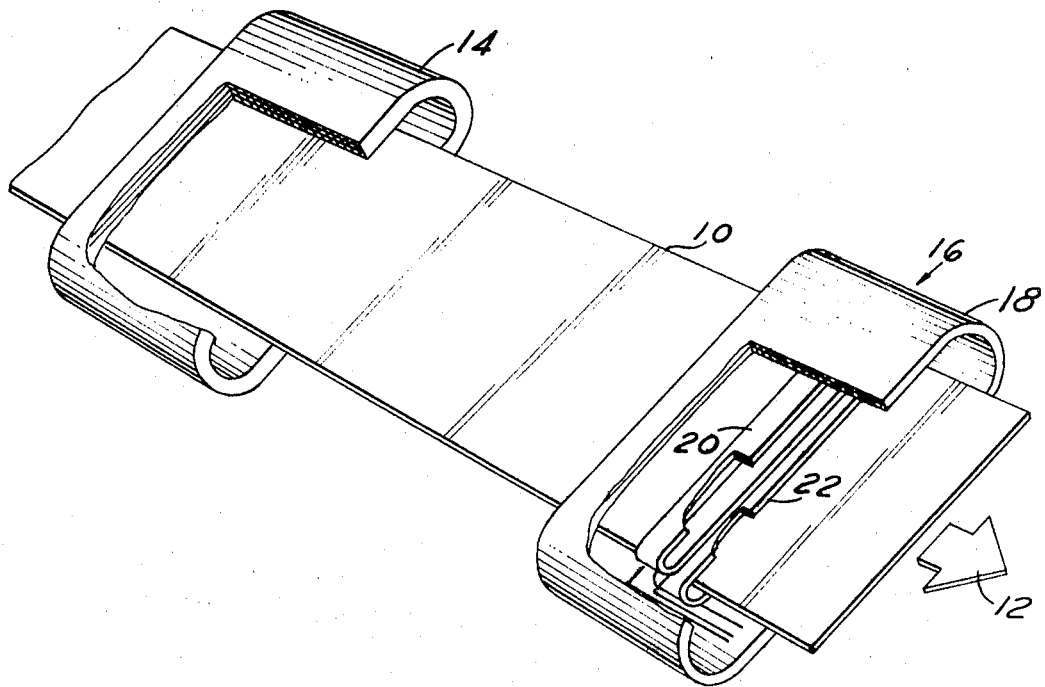
FIG. 1 is a perspective view of a DC-type mechanism used on steel strip showing the saturating coil upstream from the coercivity coil. The coercivity coil surrounds the two sensing coils.
Figure 2:
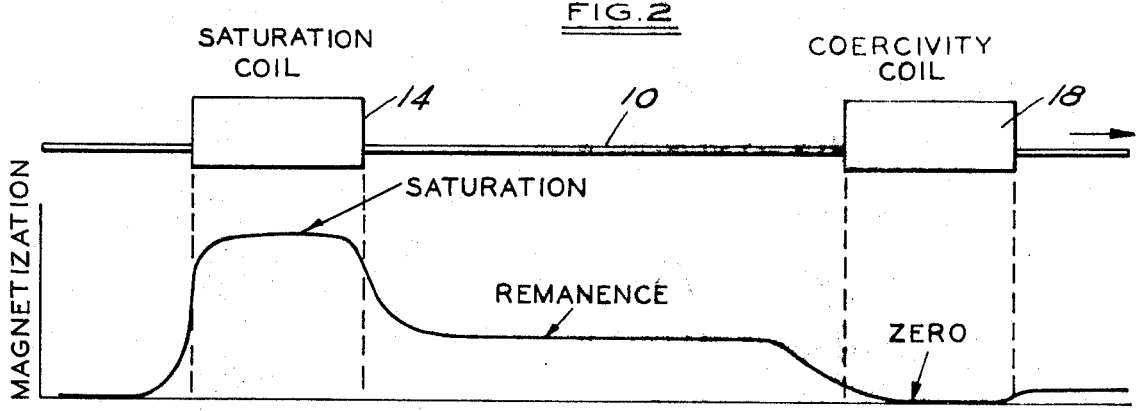
FIG. 2 is a schematic of the magnetization in the sheet as it moves through the DC system.

Referring to FIG. 1, a moving sheet of steel is represented by numeral 10. Sheet 10 can be hot band directly from the pickle tanks, cold-rolled material or material at any processing stage, and is moving in the direction of arrow 12. An electrical coil 14 having an essentially flat top and bottom and semicircular ends is made up of electrical wiring in the conventional manner and mounted to surround sheet 10 at some predetermined location. Coil 14 has a finite length as indicated in the drawing; this length must be sufficient for the magnetic field produced by current in the coil to bring the sheet magnetization substantially to effective saturation at all points across the sheet width. Coil length thus depends on several factors including the necessary amount of magnetic field and the linear speed of sheet 10.

A coercivity coil assembly 16 is located a predetermined distance downstream from coil 14. Coil assembly 16 comprises a large coercivity coil 18 that surrounds sheet 10 and also surrounds a pair of sensing coils 20 and 22. Coercivity coil 18 and sensing coils 20 and 22 also have essentially flat tops and bottoms with circular ends, and sensing coil 22 also surrounds sheet 10. For greatest accuracy, the sensing coils are located within the coercivity coil where any field applied by the coercivity coil is relatively flat.

Sensing coils 20 and 22 are connected together so the combined coils do not generate a signal in an applied magnetic field. This is accomplished by connecting identical coils in a bucking relationship. Loose lead 24 of coil 20 is brought outside of the coil assembly as is loose lead 26 of coil 22. A sensing lead 28 can be coupled to the connected coil leads and also is brought outside of the coil assembly.

Combined sensing coils 20 and 22 generate a signal whenever changes occur in the magnetic flux passing through the coils. When a ferromagnetic material is not present in either coil, the bucking relationship of the coils cancels any signal generated by a flux change in both coils, so no signal appears across leads 24 and 26 even though the applied magnetic field changes. When a ferromagnetic material is located in one coil 22, the signal generated across leads 24 and 26 is proportional only to changes in the magnetization in the material. The signal generated by coil 20 and appearing across leads 24 and 28 is proportional to changes in the magnetic field applied by coil 18 and can be used as a measure of the applied magnetic field in place of measurements of the current in coil 18 if desired.

Figure 5:
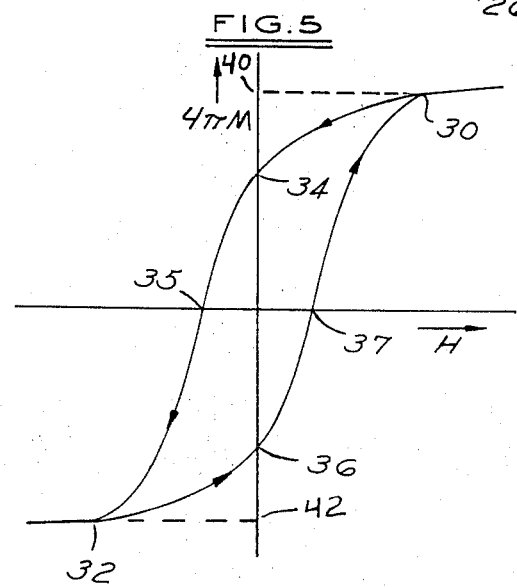
FIG. 5 is a hysteresis loop of a typical steel which is presented for illustrative purposes. The width of the loop at the X axis is exaggerated considerably in the Figure; in most low carbon steels, the horizontal distance from the Y axis to points 30 or 32 is about 100 times the distance from the Y axis to points 35 and 37.

In the hysteresis loop shown in FIG. 5 for mild steel, the positive effective saturation point is represented by numeral 30 and the negative effective saturation point is represented by numeral 32. Values of H representing the applied magnetic field are plotted along the X axis and values of $4\pi M$ representing the magnetization in the steel are plotted along the Y axis.

Once the magnetizing force of the applied field has brought the magnetization to effective saturation at point 30, reducing the magnetizing force to zero drops the magnetization to the remanent magnetization represented by numeral 34. A negative magnetic field is then necessary to bring the magnetization to zero at point 35 and the amount of negative magnetic field at point 35 is the coercive force of the steel. A typical annealed low-carbon steel requires a magnetizing force of about 687 oersteds to reach effective saturation and has a coercive force of about 5 oersteds. Virtually all hysteresis loops are symmetrical about the intercept of the axes; thus the negative remanent magnetization at point 36 generally has the same value as the positive remanent magnetization intensity at point 34 and negative amounts of coercive force represented by point 35 equal values of the positive coercive force represented by point 37.

Calibration of the DC system takes place in the following manner: As the steel strip passes through saturating coil 14, sufficient current is applied to the winding of the coil to bring the magnetization in the sheet to effective saturation point 30. When the sheet exits from coil 14, its magnetization drops to the remanent value at point 34. No current is applied to coil 18 so the sheet containing its remanent magnetization passes through sensing coil 22. With a constant remanent magnetization and sheet cross-sectional area, the signal generated across leads 24 and 26 drops to zero.

Current in saturating coil 14 then is reversed to bring the sheet to its negative effective saturation point 32. The sheet emerging from coil 14 has a magnetization corresponding to point 36. As this portion of the sheet passes through the sensing coils, the time integrated voltage signal generated across leads 24 and 26 is proportional to the magnetization change represented by the distance along the Y axis between points 34 and 36. This signal is divided in half electronically, and the resulting half value is the flux change necessary to bring the magnetization in the sheet to zero.

Once this computed zero value has been obtained, an electric current is applied to coil 18 to generate the appropriate time integrated voltage signal across leads 24 and 26. When that signal has been produced, the magnetization is at the computed zero value. Either the amount of current necessary in coercivity coil 18 or the signal generated across leads 24 and 28 is proportional to the applied magnetic field, and is used in empirical equations to compute mechanical properties such as tensile strength or yield strength.

As sheet 10 continues to move through coil assembly 16, a signal appears across leads 24 and 26 whenever the magnetization in the sheet varies from the computed value. This signal is applied to conventional equipment controlling the application of current to coercivity coil 18 to bring the magnetization back to the computed value. Monitoring the current applied to coil 18 (or the signal generated across leads 24 and 28) produces a value continuously representative of the coercive force, and hence, the mechanical properties, of sheet 10. Periodically, the equipment is recalibrated as described above to eliminate the effects of any outside influences.

Figure 3:
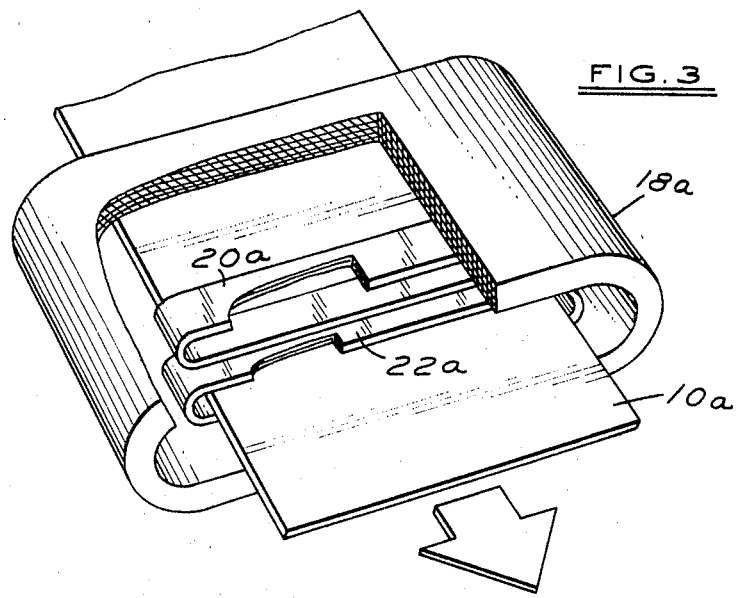
FIG. 3 is a perspective of the AC mechanism.
Figure 4:
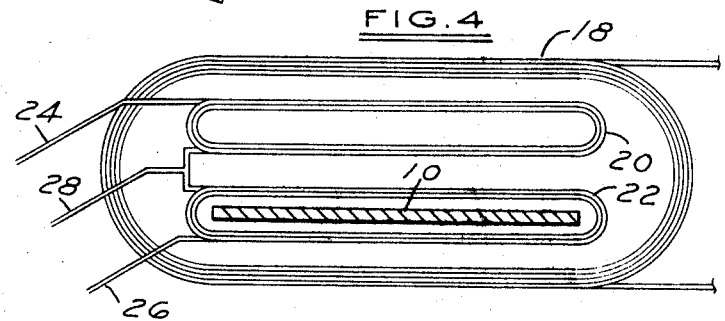
FIG. 4 is an end view of the coercivity coil assembly of the DC system showing the winding connections of the sensing coils. The same view applies to the single coil assembly of the AC mechanism.

Turning to the AC system shown in FIG. 3, a combined saturation and coercivity coil 18a surrounds sheet 10a. Two sensing coils 20a and 22a are located within coil 18a and coil 22a also surrounds sheet 10a. Coils 20a and 22a are coupled to each other in the bucking relationship described above.

Figure 7:
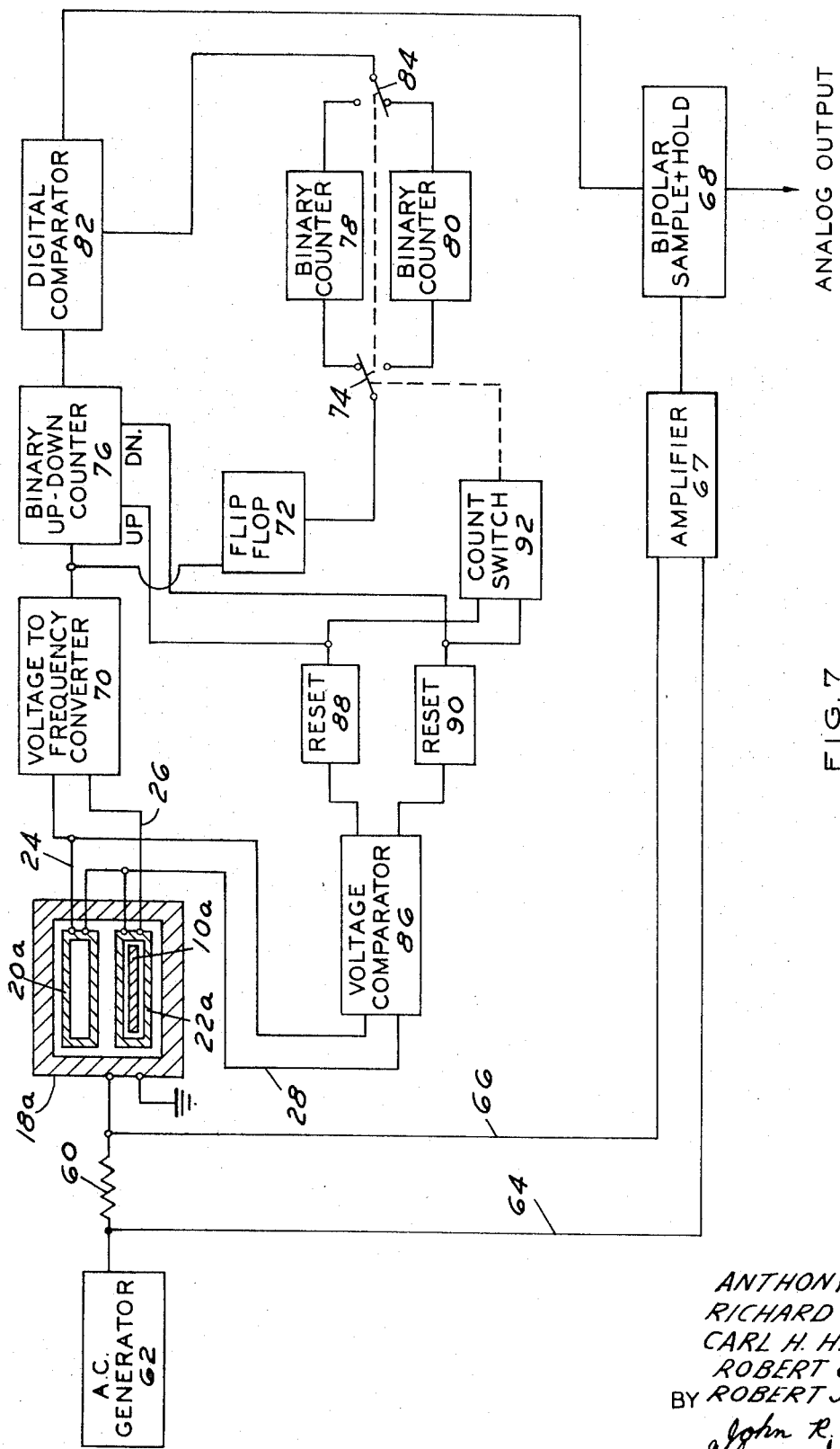
FIG. 7 is a block diagram of digital electronic circuitry used in the AC system to measure, compute, compare and sample values of the applied field and the magnetization.

As shown in FIG. 7, a resistor 60 connects one of the leads of coil 18a to an AC generator 62. The other lead of coil 18a is connected to ground. Leads 64 and 66 are connected to each side of resistor 60 and through an amplifier 67 to bipolar sample and hold circuitry 68.

Leads 24 and 26 of the sensing coils are connected to a voltage to frequency converter 70. The output of converter 70 is connected to a binary up-down counter 76 and to a binary flip-flop 72. Flip-flop 72 in turn is connected to the pole of a double throw switch 74 that connects the flip-flop to either of two binary counters 78 and 80. Counter 76 has its output connected through a digital comparator 82 to the sample and hold circuitry 68. The outputs of counters 78 and 80 are connected through another double-throw switch 84 to comparator 82. Switches 74 and 84 are ganged so when flip-flop 72 is connected to counter 78, counter 80 is connected to comparator 82.

A voltage comparator 86 connects leads 24 and 28 to a pair of reset circuits 88 and 90. Reset circuits 88 and 90 in turn are connected to counter 76 and to a count switch 92. The output of count switch 92 actuates the poles of switches 74 and 84.

Referring to FIGS. 3, 4, 5 and 7, the AC system operates in the following manner: Generator 62 supplies an alternating current to coil 18a that is sufficient to bring the magnetization in the sheet 10a to effective saturation of both signs as represented by points 30 and 32 of FIG. 5. The frequency of the alternating current is sufficiently low to permit the magnetization in the sheet to follow the hysteresis loop without appreciable lag; for most steel sheet and strip materials a frequency of about 1—10 cycles per second has been found satisfactory. Resistor 60 generates a voltage drop proportional to the current in coil 18a, and leads 64 and 66 plus amplifier 67 supply a signal representative of the instantaneous voltage drop to circuitry 68.

As the applied field changes from point 30 in FIG. 5 to point 32, the time integrated voltage generated across leads 24 and 26 is proportional to the change in magnetization represented by the distance between points 40 and 42 on FIG. 5. Converter 70 produces a frequency proportional to the voltage and counter 76 sums the number of pulses in the output of converter 70 over the time period necessary for the change. Simultaneously, flip-flop 72 divides the number of pulses produced by converter 70 by two and counter 78 sums the number of pulses from the flip-flop. When the applied field reaches point 32, counter 76 contains a binary number representing the distance between points 40 and 42 on FIG. 5, and counter 78 contains a binary number representing one-half of that distance.

When the applied field passes negative saturation point 32, the voltage generated across leads 24 and 28 reverses. Comparator 86 actuates reset 90 that instructs counter 76 to begin counting back down and also switches poles 74 and 84 to counters 80 and 78 respectively. Counter 76 starts subtracting the pulses from converter 70 representative of the movement away from point 42 from the binary number it held at point 42. Counter 80 begins counting every other pulse from converter 70 and the sum in counter 78 is applied to comparator 82.

When the applied field has changed from negative saturation point 32 to point 37, the output of counter 76 equals the sum in counter 78. Comparator 82 senses this point and triggers circuit 68, which measures the instantaneous current in coil 18a. This current is proportional to the applied field, which is the coercive force of sheet 10a as represented by point 37. Circuit 68 stores the measured value.

The applied field continues up to a positive saturation point 30, and as it passes point 30, comparator 86 actuates reset 88. Reset 88 instructs counter 76 to begin counting upward and also actuates count switch 92 which switches poles 74 and 84. When the applied field has moved down to point 35, the value in counter 76 equals the value in storage 80. Comparator 82 again trips circuitry 68, which measures the instantaneous current in coil 18l. This current is proportional to the coercive force represented by point 35. Circuitry 68 computes the numerical sum of the coercive forces represented by point 37 and point 35, and this sum is used in empirically determined formulas to compute the mechanical properties of sheet 10a. Using the numerical sum of the positive and negative coercive forces eliminates the effects of any spurious applied fields that might shift the hysteresis loop to the right or left in FIG. 5.

The applied field and the magnetization continue to trace the hysteresis loop of FIG. 5 and computations of the zero value plus measurements of coercive force are produced during each half cycle of the hysteresis loop. In this manner the computed zero value is updated continuously and measurements of the coercive force are made on succeeding segments of sheet 10a. The spacing of the measured segments of course depends on the speed of sheet 10a and the frequency of the alternating current; with strip 10a moving at 1200 feet per minute and an alternating current of 1 cycle per second, measurements of coercive force are made on segments spaced about 10 feet apart.

Figure 6:
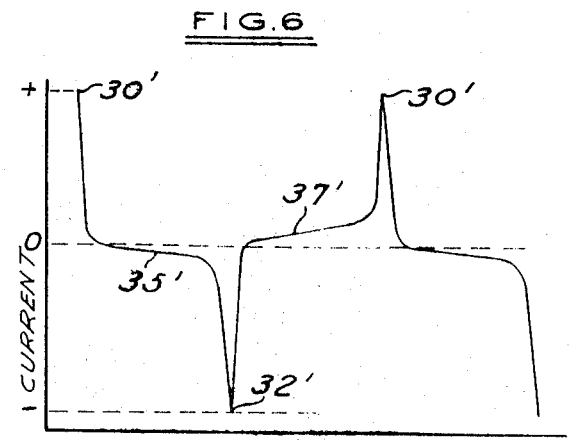
FIG. 6 is a graph of a preferred current wave form applied to the outer coil in the AC system.

Increased accuracy of the coercive force measurements along with reasonable cycle speed is obtained with the current waveform shown in FIG. 6. This waveform is selected to produce a relatively small rate of change in the magnetization in the sheet as the magnetization passes through points 35 and 37 where measurements of the applied field are to be made. In the Figure, the numerals 30' and 32' represent the current in coil 18a necessary to reach effective saturation points 30 and 32 in FIG. 5. The current drops rapidly from its value at point 30' to approximately zero, flattens until the magnetization passes beyond point 35 (represented in FIG. 6 by numeral 35') and then drops rapidly again down to point 32'. The current then rises rapidly from point 32', flattens as it approaches point 37' and then rises rapidly up to the positive effective saturation point 30'. This waveform reduces the effect of any error in the time of measurement on the measured values while permitting reasonably rapid cycles. Additional improvements in accuracy can be obtained by further reducing the rate of change of magnetization as the magnetization passes points 35 and 37. The current waveform can be symmetrical if the flattened portions are sufficiently wide to include points 35' and 37'.

Another improvement in accuracy can be obtained by using 4 individual sample and hold circuits in sample and hold circuitry 68. The individual circuits are connected in two sets with two circuits coupled in tandem in each set. Each set monitors the signal from amplifier 67 during one-half of the hysteresis loop, with the first circuit in the set merely updating the value in the second circuit each time a measurement of the current in coil 18a is made.

If desired, count switch 92 can be actuated to update the computed zero value once every full cycle or even less frequently rather than every half cycle. Additional circuitry providing a binary readout of counter 76 can be provided and a checking circuit can be connected to counter 76 to monitor the return of the sum in the counter to zero each time point 32 is reached. Such a checking circuit is used to insure that a full hysteresis loop is traversed.

Values of magnetization at the effective saturation points as measured by the sensing coils are representative of the gage of the sheet. Such values can be measured in the DC system by installing a set of sensing coils substantially identical to coils 20 and 22 in saturation coil 14. In the AC system, gage can be measured with the existing equipment simply by measuring the time integrated voltage signal across coils 20a and 22a produced by passing between the effective saturation points.

Statistical analysis of the predicted values of tensile strength based on coercive forces obtained by the above processes with the mechanically measured tensile strength of hot band SAE 1006 through 1020 steels having nominal tensile strengths of about 45—50,000 p.s.i. revealed a standard deviation of less than 1,700 p.s.i., which is well within ordinary tolerances. By comparison, using hardness, electrical resistivity, or magnetic remanence as a predictor produced a standard deviation of about 3,500 p.s.i. Similarly, using coercive forces to predict the lower yield strength of the steels produced a standard deviation of less than 2,000 p.s.i.

Thus this invention provides a process and an mechanism for determining on a substantially continuous basis mechanical properties of a moving steel strip or other ferromagnetic material without disrupting the movement or interfering with the surface of the strip. The process can be carried out by either a DC or an AC mechanism. Data from the process predicts tensile strength and yield strength of low-carbon steels with relatively high accuracy. Measurements of sheet gage also can be obtained from the process.

We claim:

1. A process for determining mechanical properties of a moving ferromagnetic material comprising
   applying a magnetizing force to the material to bring the magnetization in the material to effective saturation,
   reversing the magnetizing force to bring the magnetization in the material to effective saturation of the opposite sign,
   measuring the change in magnetization of the material between any two values of said applied magnetizing force, said values being substantially equal numerically and opposite in sign, computing the change in magnetization equal to one-half of said measured change, said computed change being the change necessary to bring the magnetization in the material essentially to zero,
   applying to the material a second magnetizing force opposite to said reversed magnetizing force and measuring the second magnetizing force when the change in magnetization produced thereby equals said computed change, said measured magnetizing force being essentially equal to the coercive force of the material, and
   computing mechanical properties of the material from said measured second magnetizing force.

2. The process of claim 1 in which the change in magnetization is measured between values of effective saturation of opposite signs.

3. The process of claim 2 comprising measuring the change in magnetization by passing the material through a sensing coil that surrounds completely a length of the material, and determining the time integrated voltage of a signal generated by said sensing coil during a change in magnetization.

4. The process of claim 3 comprising eliminating the effect of the second magnetizing force from the signal generated by said sensing coil by coupling said sensing coil in a bucking relationship with a second sensing coil, said second coil being located where it generates a signal from the second magnetizing force corresponding to the signal generated by the second magnetizing force in the first sensing coil.

5. The process of claim 4 comprising reducing the rate of change of the second magnetizing force as the second magnetizing force passes through said computed change in magnetization.

6. The process of claim 5 in which the step of computing the change in magnetization comprises converting the change in magnetization into a frequency signal, and digitally counting the pulses of said frequency signal to produce a digital numeral representing the instantaneous change in magnetization.

7. The process of claim 6 in which the step of computing the change in magnetization further comprises digitally counting one-half of said pulses of said frequency signal to produce a digital numeral representing said computed change in magnetization, and includes comparing said last mentioned digital numeral with the digital numeral of claim 7 to determine when the applied magnetizing force equals the coercive force of the material.

8. The process of claim 7 in which the step of computing the mechanical properties comprises storing the coercive force of one sign, adding numerically the coercive force of the opposite sign thereto, and using the sum of said coercive forces to compute mechanical properties of the material.

9. The process of claim 1 comprising measuring the change in magnetization by passing the material through a sensing coil that surrounds completely a length of the material, and determining the time integrated voltage of a signal generated by said sensing coil during a change in magnetization.

10 The process of claim 1 comprising reducing the rate of change of the second magnetizing force as the second magnetizing force passes through said computed change in magnetization.

11. The process of claim 1 in which the step of reversing the magnetizing force comprises, in sequence,
   reducing the magnetizing force to zero and permitting the magnetization to stabilize at a remanent value, applying a magnetizing force of the opposite sign to bring the magnetization to effective saturation of the opposite sign, reducing the magnetizing force to zero and permitting the magnetization to stabilize at the remanent value of the opposite sign, and
   the step of measuring the change in magnetization comprises measuring the change in magnetization between the remanent values.

12. The process of claim 11 in which the saturating magnetizing forces are applied to the material at a location upstream from the location where the second magnetizing force is applied.

13. The process of claim 1 in which the step of computing the change in magnetization comprises converting the change in magnetization into a frequency signal, and digitally counting the pulses of said frequency signal to produce a digital numeral representing the instantaneous change in magnetization.

14. The process of claim 13 in which the step of computing the change in magnetization further comprises digitally counting one-half of said pulses of said frequency signal to produce a digital numeral representing said computed change in magnetization, and includes comparing said last mentioned digital numeral with the digital numeral of Claim 14 to determine when the applied magnetizing force equals the coercive force of the material.

15. The process of claim 14 in which the step of computing the mechanical properties comprises storing the coercive force of one sign, adding numerically the coercive force of the opposite sign thereto, and using the sum of said coercive forces to compute mechanical properties of the material.

16. A mechanism for determining mechanical properties of a moving ferromagnetic material comprising
   an electrical coil means surrounding a length of the material for applying a magnetic field to the length of material that effectively magnetically saturates a portion of the length of the material,
   electrical means connected to said electrical coil means for reversing the magnetic field applied by said coil means to magnetically saturate effectively the material in the opposite direction,
   sensing coil means proximate to the material for measuring the change in magnetization in the material as the magnetization changes between any two values substantially equal numerically but opposite in sign,
   computing means connected to said sensing coil means for computing one-half of the measured change in magnetization, said computed value being the change in magnetization necessary to bring the magnetization from either of said values to a substantially zero magnetization, and
   measuring means coupled to said electrical coil means for measuring the magnetic field generated by said electrical coil means necessary to bring the magnetization of said material to substantially zero magnetization, said measured magnetic field being substantially proportional to mechanical properties of the material.

17. The mechanism of claim 16 in which the sensing coil means comprises a pair of sensing coils located within said electrical coil means, one of said sensing coils surrounding a length of the material smaller than the length surrounded by said electrical coil means, the second sensing coil being located where a magnetic field of the electrical coil means produces substantially equal signals in both sensing coils, said sensing coils being connected to each other in a bucking relationship so a voltage signal produced across the combined sensing coils is independent of the applied magnetic field and is substantially proportioned to the change in magnetization in the material surrounded by the first sensing coil.

18. The mechanism of claim 17 comprising converter means for converting the voltage signal from the combined sensing coils into a frequency proportional to the magnitude of the voltage and digital counter means for producing an instantaneous digital numeral representative of the time integrated voltage signal from said sensing coils.

19. The mechanism of claim 18 comprising digital means for producing a second digital numeral proportional to one-half of the digital numeral produced by said counter means during a change in magnetization between any two values equal numerically but opposite in sign, digital comparator means for producing a signal when said second digital numeral substantially equals the instantaneous digital numeral of claim 19, and sampling means for measuring the magnetic field applied by said electrical coil means when a signal is received from said comparator means.

20. The mechanism of claim 19 in which said counter means is an up-down counter and comprising a voltage comparator means coupled to said second sensing coil for producing a signal when the applied field passing through said second sensing coil changes in sign, said signal from said comparator means changing the counting direction of said up-down counter.

21. The mechanism of claim 20 in which said digital means comprises a pair of digital counters and switch means connecting the input of one counter to said converter means and the output of the other counter to said digital comparator means, said switch means changing the input and output connections wherever a signal is produced by said voltage comparator means.

22. The mechanism of claim 21 in which the sampling means determines the magnetic field applied by said electrical coil means by measuring the current in said electrical coil means.